United States Patent [19]
Kim

[11] Patent Number: 5,812,762
[45] Date of Patent: Sep. 22, 1998

[54] PERSONAL COMPUTER HAVING CARD READ/WRITE CONTROLLER

[75] Inventor: Young-Min Kim, Suwon, Rep. of Korea

[73] Assignee: SamSung Electronics Co., Ltd., Suwon, Rep. of Korea

[21] Appl. No.: 624,314

[22] Filed: Mar. 27, 1996

[30] Foreign Application Priority Data

Mar. 31, 1995 [KR] Rep. of Korea ................... 7855/1995

[51] Int. Cl.⁶ .................................................. H04K 1/00
[52] U.S. Cl. ........................................ 395/186; 380/25
[58] Field of Search ........................... 395/186, 187.01, 395/188.01; 257/679; 380/4, 23, 25

[56] References Cited

U.S. PATENT DOCUMENTS

| | | | |
|---|---|---|---|
| 5,081,675 | 1/1992 | Kittirutsunetorn | 380/4 |
| 5,091,939 | 2/1992 | Cole et al. | 380/23 |
| 5,097,506 | 3/1992 | Kaiser, Jr. et al. | 380/25 |
| 5,226,080 | 7/1993 | Cole et al. | 380/25 |
| 5,233,658 | 8/1993 | Bianco et al. | 380/25 |
| 5,282,247 | 1/1994 | McLean et al. | 380/4 |
| 5,297,200 | 3/1994 | Murray | 380/4 |
| 5,327,497 | 7/1994 | Mooney et al. | 380/25 |
| 5,347,580 | 9/1994 | Molva et al. | 380/25 |
| 5,448,045 | 9/1995 | Clark | 380/4 |

OTHER PUBLICATIONS

Auto matic Identification Data book, Dallas Semiconductor, pp. 156–157, 1995.

Book of DS19xx Touch Memory Standards, Dallas Semiconductor, pp. 2–9, 1995.

*Primary Examiner*—Albert Decady
*Attorney, Agent, or Firm*—Robert E. Bushnell, Esq.

[57] ABSTRACT

A card read and write controller for use in a personal computer according to the present invention includes a voltage generator for supplying a power voltage to the chip-in card when the chip-in card is inserted into a card insertion slot; a clock generator for supplying an initial clock signal to the chip-in card. A bus interface serves the host controller, while a serial port accommodates serial data communication with the host controller. A bootable read-only-memory (ROM) provides a booting control program, a common random-access-memory (RAM) stores operational and program data, and a central processing unit (CPU) controls activation of a light-emitting-diode (LED) indicating the insertion or ejection of the chip-in card, generates the interrupt signal, and checks whether data transmitted to the card and data received from the card are identical with each other to determine that the inserted chip-in card is an authorized card for the personal computer system.

15 Claims, 5 Drawing Sheets

PERSONAL COMPUTER HAVING CARD READ/WRITE CONTROLLER

CROSS-REFERENCE TO RELATED APPLICATIONS

This application makes reference to, incorporates the same herein, and claims all benefits accruing under 35 U.S.C. §119 from an application for Personal Computer Having Card Read/Write Controller earlier filed in the Korean Industrial Property Office on 31 Mar. 1995 and there duly assigned Ser. No. 7585/1995.

BACKGROUND OF THE INVENTION

1. Technical Field

The present invention relates to a personal computer system, and more particularly to a personal computer system having a card read and write controller using a chip-in card for preventing unauthorized use of the personal computer.

2. Background Art

As personal computer systems become more accessible to public, confidential data on files contained therein is increasingly susceptible to unauthorized inspection. Accordingly, it is necessary to ensure that access to such confidential data and systems is restricted to certain authorized users. Traditionally, many personal computer systems use a physical key switch as a means to restrict access to the computer. The mechanical key switch is provided at a keyboard and used to disable all keyboard activity. For example, if the key switch is manually switched to an unlocked position, the keyboard characters are transmitted to the computer. If, on the other hand, the key switch is manually switched to a locked position, the keyboard characters are not transmitted to the computer. This technique, however, fails to provide a practical means of controlling a variety of levels of authorized access to given types of data or peripherals. Moreover, the required manipulation of the mechanical key switch can hardly restrict access to the computer.

Another technique for restricting unauthorized access to the computer system involves a software based password feature in which the password from a user is required in order to gain access to the computer systems. Typically, only authorized users are assigned a password. Each time the user wishes to use the computer system, he/she must first enter the password through an keyboard. If the computer system recognizes the password as valid, the user will be permitted to access the data and/or execute the programs stored therein. Persons not entering a valid password are unable to access the data or program information. In this way, the password protection scheme protects the propriety or confidential information retained by the computer system and prevents unauthorized use. A variation of this password protection scheme is disclosed, for example, in U.S. Pat. No. 5,097,506 for Keyboard PasswordLock issued to Kaiser. To maintain the integrity of the password protection system, however, authorized users are commonly instructed to refrain from writing or otherwise recording their passwords. Although this procedure prevents unauthorized users from accessing the computer systems, however, the authorized users must memorize their passwords; otherwise, a forgotten password renders a computer useless. In order to extend the benefits of password protection to a forgetful user, many computer manufacturers such as those disclosed, for example, in U.S. Pat. Nos. 5,091,939 and 5,226,080 for Method And Apparatus For Password Protection Of A Computer issued to Cole et al., provide a secondary password by way of telephone for allowing the forgetful but authorized user to gain access to the computer systems when a primary password is forgotten. In such a conventional password protection scheme, however, if an unauthorized user obtains the password, then unauthorized uses cannot be prevented. Moreover, this password protection scheme may also be bypassed by commercially available software development tools. Further, this protection scheme does not allow operation of desired application programs during the time unauthorized use program is executed to prevent unauthorized use of the computer. Consequently, it has been my observation that it is difficult for the user to access the computer effectively but a password protection scheme actually diminishes the operational efficiency of the computer.

A more recent technique for restricting unauthorized access to the computer system involves the use of an IC card such as that disclosed, for example, in U.S. Pat. No. 5,297,200 for Computer Security System issued to Murray and U.S. Pat. No. 5,327,497 for Prebool Protection Of Unauthorized Use Of Programs And Data With A Card Reader Interface issued to Mooney et al. In Murray '200, for example, a card reader is integrated into a computer system for reading data from a memory card and for enabling software to compare with authorization data contained in the computer in order to enable or disable further operation of the protected program. Similarly, Mooney '497 discloses a personal computer system comprising a computer, a keyboard, a card interface board having an IC card reader for accommodating an IC card used as a means to access the computer system if an authorization code stored in the IC card matches to the code entered by the user. Otherwise, the IC card reader serves to prevent unauthorized use of the computer. In Mooney '497, however, the authorized user is required to enter an authorized code before the computer system can be accessed. If the authorized user forgets his/her authorized code, the forgotten code also renders the computer system useless. Accordingly, it has been my observation that neither Murray '200 nor Mooney '497 effectively utilizes IC card as a means to prevent unauthorized use of the personal computer system. Consequently, I have discovered a need for improving a construction of a card read/write controller for efficiently accommodating an IC card as a means for preventing unauthorized use of the personal computer system.

SUMMARY OF THE INVENTION

Accordingly, it is therefore an object of the present invention to provide an improved computer system and process enabling operational use of that computer system.

It is another object to provide a computer system and process capable of preventing unauthorized use of the computer using a chip-in card.

It is yet another object to provide a computer system and process capable of preventing unauthorized use of the computer by controlling data input of an input device such as a keyboard or a mouse, in accordance with the insertion or ejection of a chip-in card.

It is still another object to provide a personal computer system and process capable of preventing unauthorized access to certain programs of the computer in dependence upon an insertion or ejection of a chip-in card, while concomitantly allowing operation of other programs contained in the computer.

It is still yet another object to provide a personal computer system having a card read/write controller constructed to enhance the reliability of signal transmission between a chip-in card and the computer.

These and other objects of the present invention may be achieved according to the principles of the present invention with a personal computer system constructed with a card read and write unit having a card reception slot, for determining whether a chip-in card is inserted into the reception slot and for determining whether the inserted card is authorized for enabling an operator to access to the computer system in dependence upon the insertion or ejection of the chip-in card. A card read and write controller is electrically connected to the card read and write unit to generate an interrupt signal indicating the insertion or ejection of the chip-in card, and for controlling the reading and writing of information on the chip-in card through the card read and write unit. An input device such as a keyboard or a mouse, allows the operator to input data and commands to the computer system, while a host controller is connected to the card read and write controller in order to lock the keyboard and thereby prevent input of data and commands to the computer system and thus prevent unauthorized use of the computer system, and to unlock the keyboard to allow data to be received from the keyboard by the computer system in dependence upon reception of the interrupt signal.

A card read and write controller as contemplated by the present invention, may be constructed with a voltage generator for supplying voltage to the chip-in card when the chip-in card is inserted into the card insertion slot, a clock generator for supplying an initial clock signal to the chip-in card, a bus interface for bus interface with the host controller and a serial port for serial data communication with the host controller. A bootable read-only-memory (ROM) has a booting control program, a common random-access-memory (RAM) stores operational and program data, and a central processing unit (CPU) activates operational control of a light-emitting-diode (LED) indicating the insertion or ejection of the chip-in card, generates the interrupt signal, checks whether data transmitted to the card and data received from the card are identical with each other, and recognizes that the inserted chip-in card is an authorized card for the personal computer system. In accordance with the principles of the present invention, it is preferable that the clock signal is supplied to the chip-in card through a damping resistor installed in the card read and write controller so that signal transmission can be enhanced.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
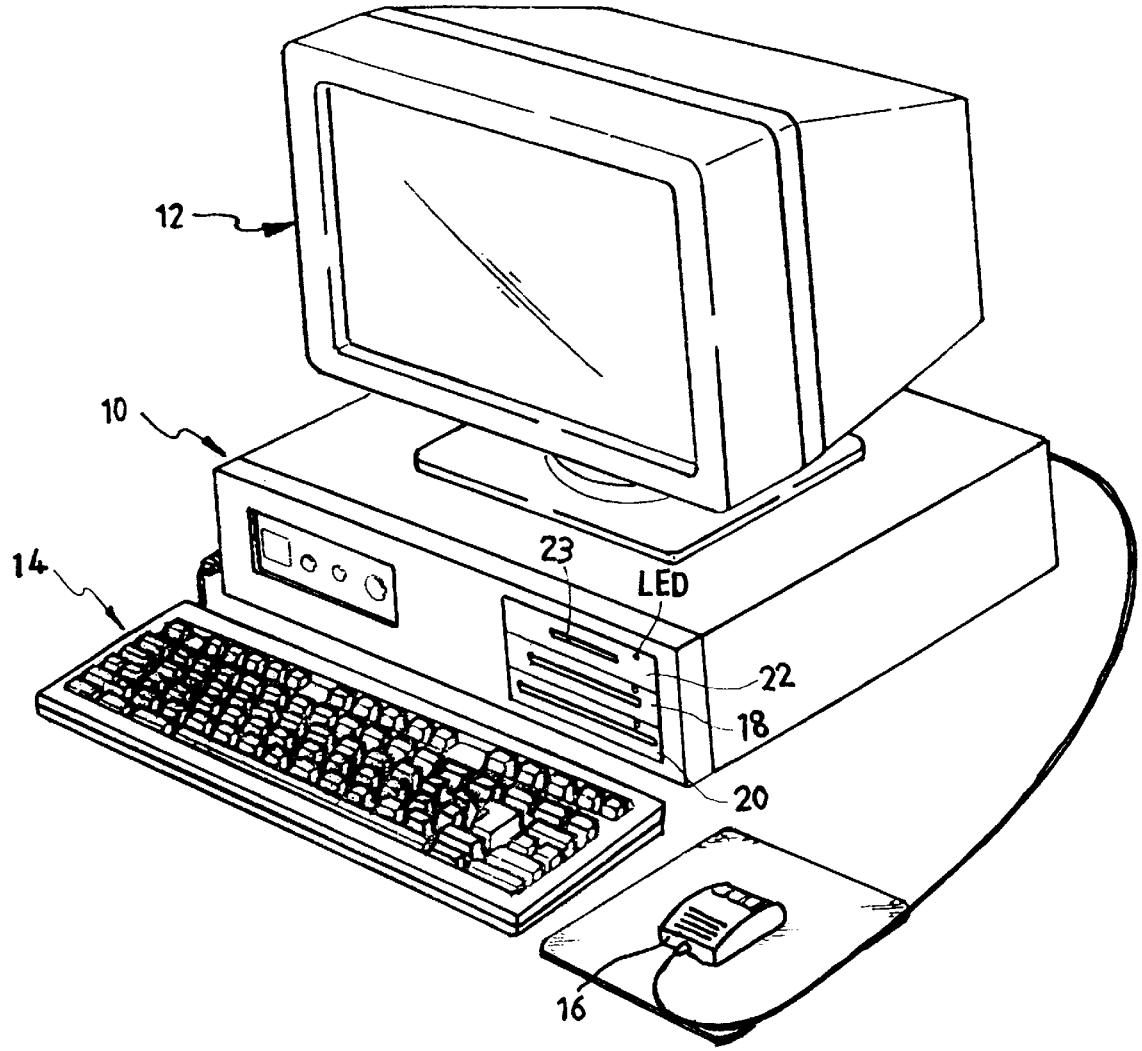
FIG. 1 illustrates a personal computer system including a chip-in card read and write unit constructed according to the principles of the present invention.

Referring now to the drawings and particularly to FIG. 1, which illustrates a personal computer system constructed according to the principles of the present invention. The personal computer system of FIG. 1 includes a main computer body 10, a monitor 12 and input devices such as a keyboard 14 and a mouse 16. The main computer body 10 includes auxiliary memory devices such as a 3.5" floppy disk drive 18, a 5.25" floppy disk drive 20, a hard disk drive (not shown), and a card read/write unit 22 having a chip-in card insertion slot 23. A light emitting diode (LED) or lamp is installed in card read and write unit 22, and floppy disk drives 18 and 20, respectively, to indicate the use status therewith.

The chip-in card as contemplated by the present invention is generally referred to as an IC card, an electronic card, a smart card or a memory card. The chip-in card is a conventional plastic card containing an integrated circuit installed in the plastic card and having a liquid crystal display section and battery installed on one side for enabling an operator to inquire and provide a visual display of the information contents of the card's memory. Such an IC card also contains read only memory (i.e., a ROM), a random access memory (i.e., a RAM), a central processing unit (i.e., microcomputer), a plurality of connectors (usually eight contacts) connecting to a terminal in accordance with ISO standards (International Standardization Organization) for supplying power and enabling data processing, and a nonvolatile memory capable of storing information such as, for example, personal identification of the operator.

Figure 2:
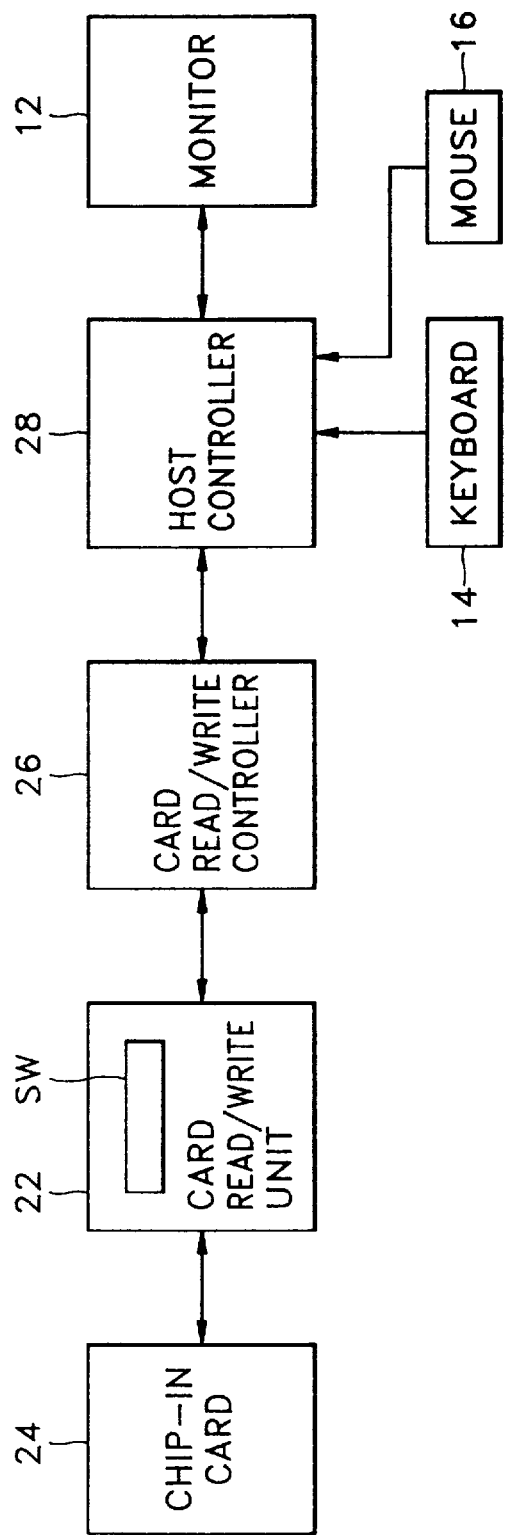
FIG. 2 is a block diagram illustrating the structure of a personal computer system including the card read and write unit as shown in FIG. 1.

Turning now to FIG. 2, the personal computer system constructed according to the principles of the present invention includes a card read/write unit 22 for detecting the insertion or ejection of a chip-in card 24 and providing electrical connections to the chip-in card, a card read and write controller 26 for generating an interrupt according to a detection signal generated from the card read and write unit 22 and controlling the reading and writing of information through card read and write unit 22, and a central controller 28 for receiving the interrupt generated from card read and write controller 26 and controlling the input of commands and information from at least one input device such as a keyboard 14 or a mouse 16 in order to allow authorized access or deny unauthorized access to the computer. Here, when the chip-in card 24 is inserted into the card insertion opening or slot 23 of the card read and write unit 22 but subsequently ejected from the card insertion slot 23 if the inserted card 24 is determined as an unauthorized or invalid card, the host controller 28 receives the interrupt and prevents the input of commands and information from the input devices to deny access the computer. When the chip-in card 24 is inserted into the card insertion slot 23 of the card read and write unit 22 and is maintained inserted in the card insertion slot 23 when the inserted card 24 is determined as an authorized or valid card, the host controller 28 receives the interrupt and allows the input of commands and information therefrom in order to access the computer and output a processing result to the monitor 12.

Figure 3:
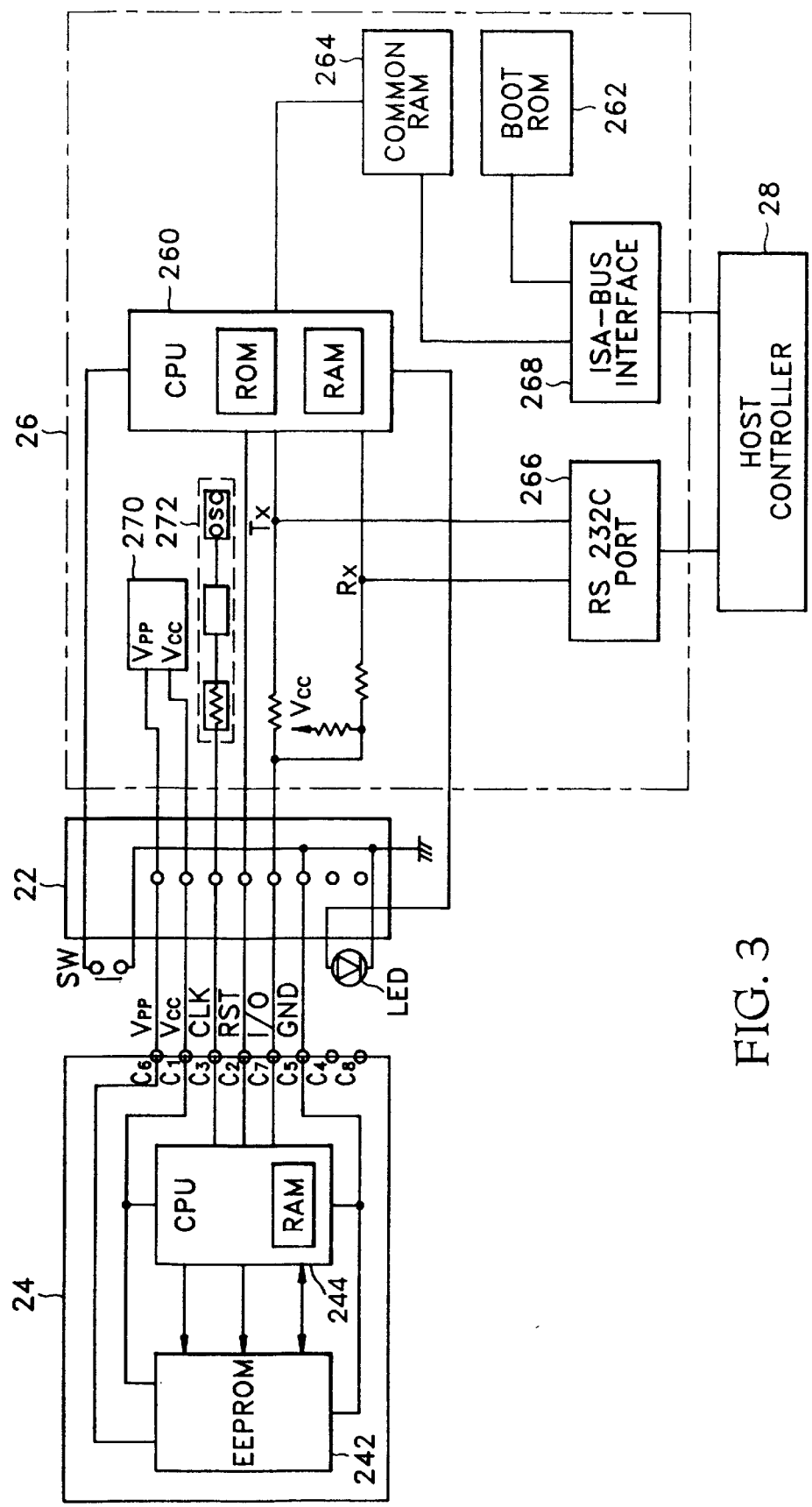
FIG. 3 illustrates a detailed circuit construction of a chip-in card, a card read and write unit and a card read and write controller of the personal computer system constructed according to the principles of the present invention.

FIG. 3 illustrates a detailed circuit construction of a chip-in card 24, a card read/write unit 22 and a card read/write controller 26 of the personal computer system according to the present invention. Generally, the chip-in card 24 for use in the personal computer system may be classified as being one of two different types. The first type is active-type known as an integrated circuit (IC) card which is provided with a microcomputer and a memory, while a second type is a passive-type containing a memory but not microcomputer and is known simply as a memory card. Typically, the physical shape, and dimensions are standardized according to the International Standardization Organization. For the sake of convenience, however, the chip-in card 24 as shown in FIG. 2 represents an IC card comprising a central processing unit (CPU) 240, EEP ROM 21 for storing operating program to perform electrical writing and erasing, when the chip-in card 24 is inserted into the card insertion slot 23 of the card read/write unit 22, and RAM 244 for working storage. The connector terminal 248 is formed of eight conductors C1 through C8 of which C1 represents a supply voltage (Vcc) input terminal, C2 represents a reset (RST) signal input terminal, C3 represents a clock (CLK) signal input terminal, C5 represents a ground (GND) terminal, C6 represents an EEPROM drive voltage (Vpp) input terminal, C7 represents a data input/output (I/O) terminal, and C4 and C8 represent reserved terminals.

As shown in FIG. 3, when the chip-in card 24 is in use, electric power (0 V, +5 V) is supplied to the CPU 240 by way of the terminals C4 and C8 when the chip-in card 24 is inserted into card insertion slot 23 of the card read/write unit 22. A reset pulse and a clock signal are also supplied to the CPU 240 through the connector C7 and connector C6. Serial data exchange between the CPU 240 and the card read/write controller 26 is performed through the connector C2. The remaining connectors C1 and C3 are extra contacts. In addition, the CPU 240, the ROM 242 and RAM 244 are interconnected through data bus so that the CPU 240 can control operations of each constituent element.

Card read and write unit 22, on the other hand, includes a detection switch (SW) which is triggered upon detection of signals received from the chip-in card 24 when the chip-in card 24 is inserted into the card insertion slot 23, an LED indicator lamp which is lit when the chip-in card 24 is inserted, remains unlit when the chip-in card 24 is not inserted, or turns off when the chip-in card 24 is ejected from the card insertion slot 23. In addition, the card read and write unit 22 also contains contact terminals for electrically connecting to the pins of inserted card 24. Here, the card read and write unit 22 may be provided with a loading motor (not shown) for actuating the insertion and ejection of the chip-in card 24 as the chip-in card 24 is being inserted into the card insertion slot 23 by an operator.

Card read and write controller 26 is constructed with a central processing unit (CPU) 260 including a read-only-memory (ROM) for storing application or main programs, a random-access-memory (RAM) for storing data generated from operating the application programs, a boot read-only-memory (ROM) 262, a common random-access-memory (RAM) 264, an RS 232C port 266, an ISA-BUS interface 268, a voltage generator 270 and a clock generator 272 for supplying an initial clock signal and the voltages VCC and VPP to the contact terminals of the card read and write unit 22 for use with the chip-in card 24 when the chip-in card 24 is inserted into the card insertion slot 23.

Card read and write controller 26 is installed in the main computer body 10, and connected to the card insertion slot 23 of card read and write unit 22 by multi-wiring and to host controller 28 through the ISA-BUS interface to allow data communication. Clock generator 272 includes an oscillator (OSC), a bead and a damping resistor. Here, the damping resistor is designed to enable the clock signal generated from the oscillator to be securely provided to the chip-in card 24 in order to enhance the reliability when the clock signal is transmitted. CPU 260 controls the turning on/off of the LED indicator lamp according to the detection signal generated from the detection switch (SW), generates an interrupt signal for preventing the unallowed use and a reset signal for resetting the. In addition, the CPU 260 also checks whether data transmitted from CPU 260 to the chip-in card 24 and data received from the chip-in card thereto are identical to each other and recognizes that only when different, the inserted chip-in card is an unauthorized or otherwise valid card for the personal computer system. Accordingly, the CPU 260 can receive reliable data at the time of signal transmission from the chip-in card. The card read and write controller 26 is connected to card read/write unit 22 by multi-wirings and connected to host controller 28 by an RS232C serial data transmission technique to allow data communication. The interrupt signal generated from the CPU 260 is transmitted to host controller 28 in order to initiate an unauthorized use interrupt routine for preventing unauthorized use of the computer system.

The host controller 28 includes a central processing unit (CPU) of the personal computer system, for performing an unauthorized use interrupt routine in order to prevent unauthorized use of the computer system, if an eject interrupt is supplied from card read and write controller 26 to control the computer system, when there is no chip-in card 24 inserted or when the chip-in card 26 is ejected. That is, the host controller 28 prevents the input of commands through keyboard 14 or mouse 16. Here, in order to enhance the use efficiency of the computer, the unauthorized use can be prevented by the interrupt function during performing a main program so that any other desired application programs can be performed while the unauthorized use is prevented.

Figure 4:
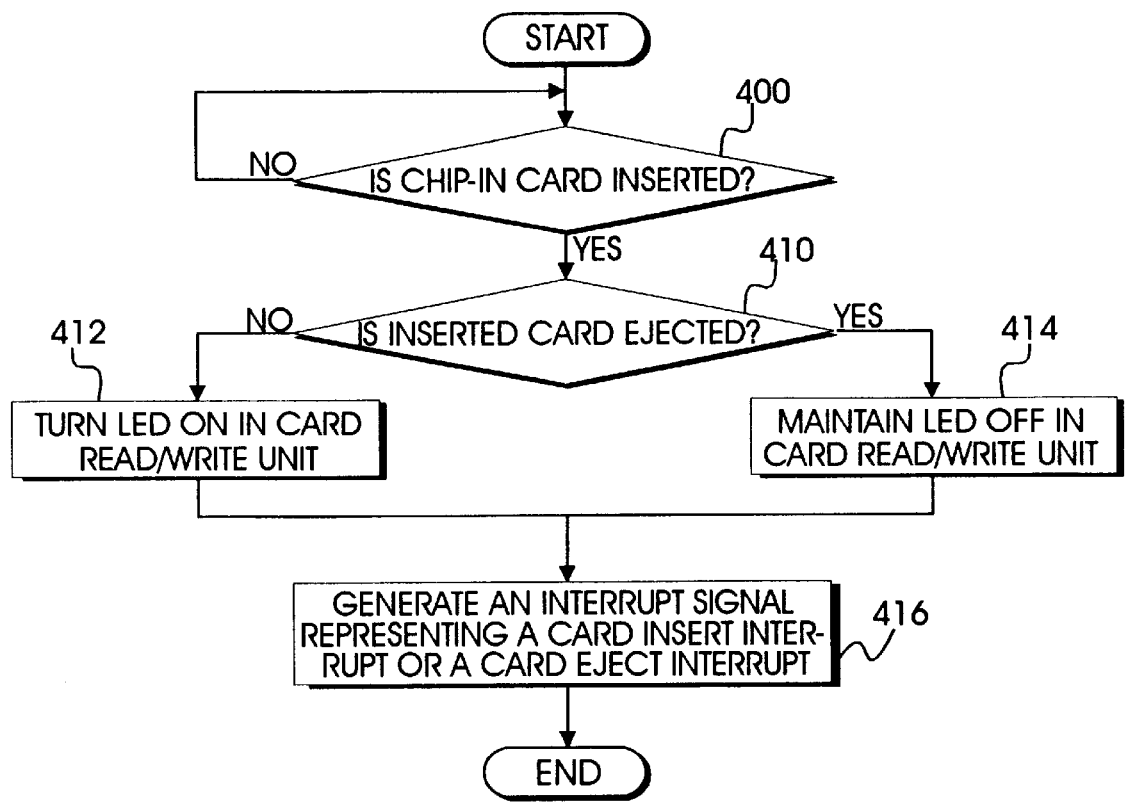
FIG. 4 is a flowchart of a card insertion interrupt routine of a card read and write controller for determining whether a chip-in card has been inserted into a card insertion slot of the card read/write unit as shown in FIG. 2.

Turning now to FIG. 4, which illustrates a card insertion interrupt routine for determining whether a chip-in card 24 has been inserted into the card read and write unit 22. When the chip-in card 24 of FIG. 2 is inserted into the card insertion slot 23 of the card read and write unit 22, the detection switch (SW) is turned on, and the card read and write controller 26 determines whether the chip-in card 24 is inserted at step 400. Once the chip-in card 24 is inserted at step 400, card read and write controller 26 determines whether the inserted card 24 is maintained inserted in the card insertion slot 23 or ejected from the card insertion slot 23 at step 410 according to a detection signal output from card read and write unit 22. If the inserted card 24 is maintained inserted, the LED of card read and write unit 22 is turned on at step 412 which allows the card read and write controller 26 to generate a card insert interrupt at step 416. If, on the other hand, the inserted card 24 is ejected from the card insertion slot 23 of the card read and write unit 22, the detection switch is turned off, thereby enabling card read and write controller 26 to maintain the LED of card read and write unit 22 in an off state at step 414. After that, card read and write controller 26 generates a card ejection interrupt at step 416 and terminates the interrupt routine.

Figure 5:
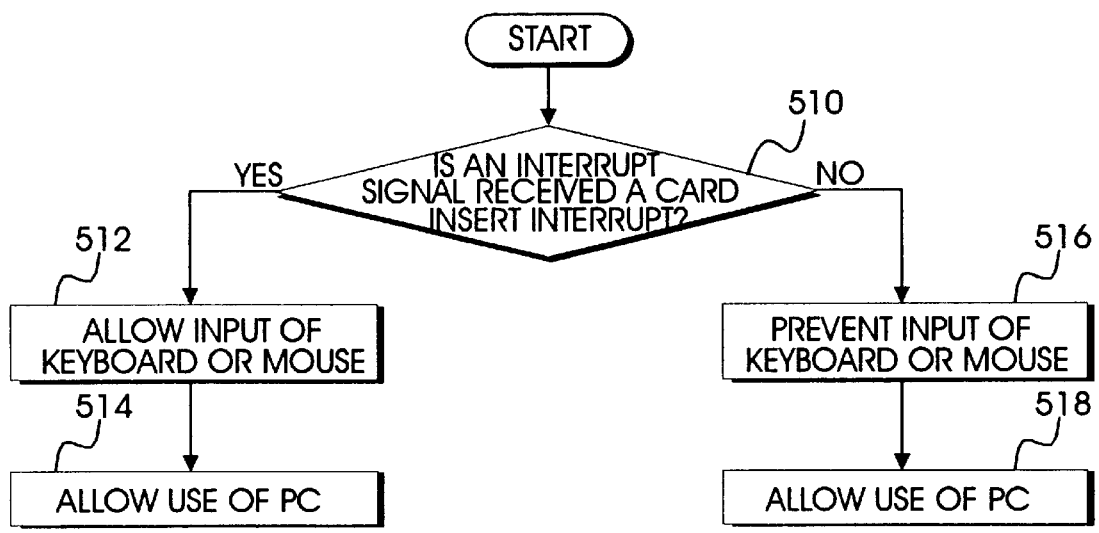
FIG. 5 is a flowchart of an unauthorized use interrupt routine of a central controller for preventing unauthorized use of the computer in dependence upon whether a chip-in card has been inserted into the card read and write unit as shown in FIG. 2.

Referring now to FIG. 5, which illustrates an unauthorized use interrupt routine for preventing unauthorized use of the computer in dependence upon whether a chip-in card 24 has been inserted into the card read and write unit 22 as shown in FIG. 2. After an interrupt signal representing either a card insert interrupt or a card eject interrupt is generated from card read and write controller 26, the host controller 28 determines whether the interrupt signal received from the card read and write controller 26 at step 510 is one of a card insert interrupt or a card eject interrupt. When the interrupt signal received from card read and write controller 26 is a card insert interrupt which indicates that the chip-in card 24 is maintained inserted in the card insertion slot 23 of card read and write unit 22, the host computer 28 allows the input of the keyboard 14 or the mouse 16 at step 512 in order to gain access to the personal computer and to make complete use of the personal computer at step 514. When the interrupt signal received from card read and write controller 26 is a card ejection interrupt which indicates that the chip-in card 24 is ejected from the card insertion slot 23 of card read and write unit 22, however, the host computer 28 prevents the input from the keyboard 14 or the mouse 16 at step 516 in order to prevent unauthorized use of the computer at step 518. After performing steps 514 and 518, the program terminates.

Figure 6:
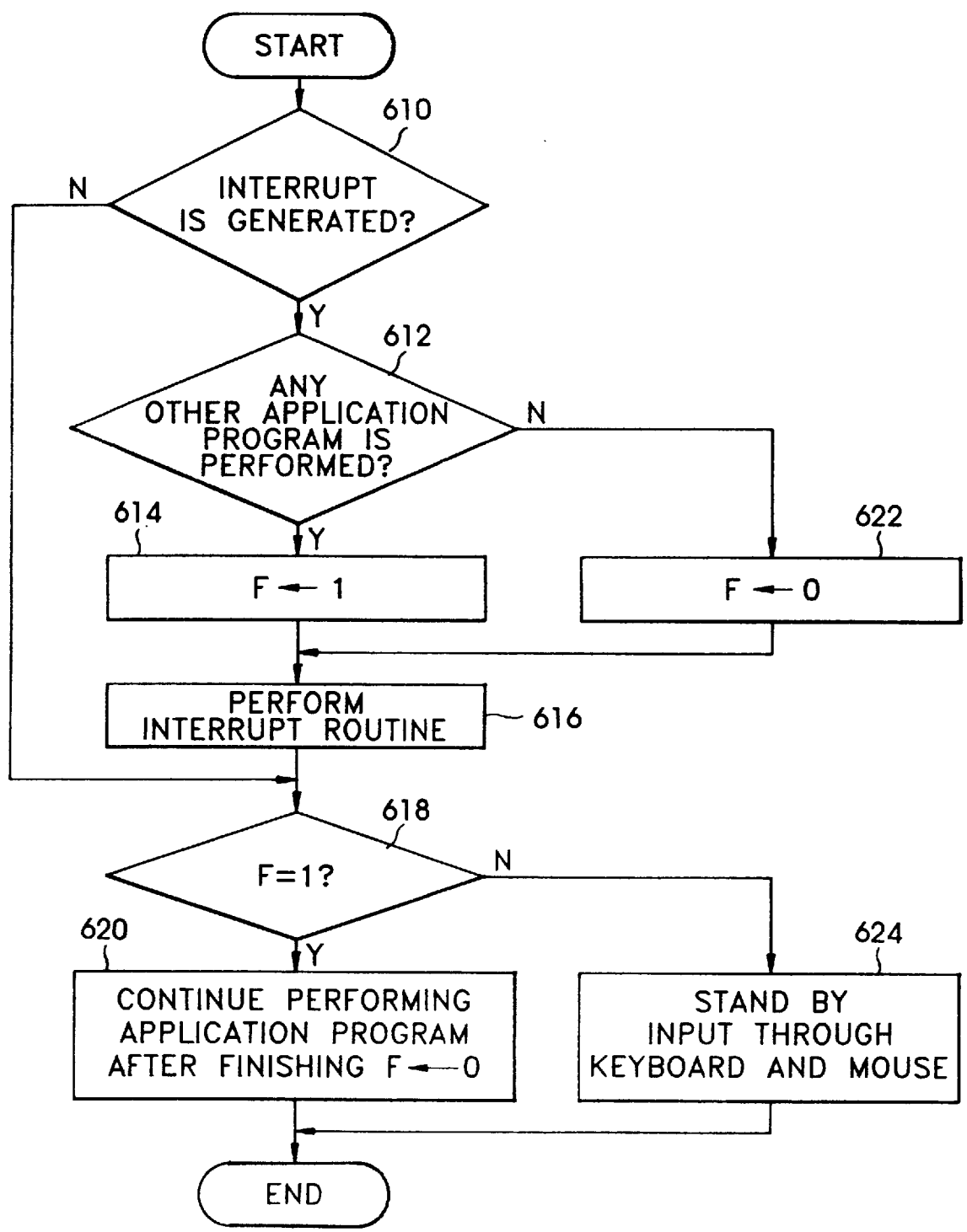
FIG. 6 is a flowchart illustrating a main program having an interrupt function for preventing unauthorized use of the computer in the central controller as shown in FIG. 2.

Referring now to FIG. 6, which illustrates the relationship between the unauthorized use prevention program and the application program currently executed by a host controller 28 in order to enhance the operational efficiency of the computer. The host controller 28 of FIG. 2 checks whether the interrupt signal is generated from the card read and write controller 26 during performance of a main application program at step 610. If the interrupt signal is generated from the card read and write controller 26, the host controller 28 determines whether any other application program is performed at step 612. If any other application program is performed, a flag value of 1 is set at step 614, and then the interrupt routine for preventing the unauthorized use as shown in FIG. 5 is performed at step 616 in order to lock or unlock the input from the keyboard or the mouse. When no application program is performed at step 612, however, a flag value of 0 is set at step 622, and then the interrupt routine for preventing the unauthorized use at step 616 is performed.

If on the other hand, the interrupt signal is not generated at step 6 10, step 618 is performed. Next, the flag value is checked at step 618. If the flag value indicates 1, the application program in process continues to be performed. When the performance is completed, the flag value of 0 is set at step 620. When the flag value indicates 0, at step 618, the input of orders through keyboard 14 or mouse 16 remains stand by at step 624.

According to the present invention, the chip-in card can effectively be used to control the input of the input device such as a keyboard as a means to prevent unauthorized use of the computer system. That is, an interrupt generated by the insertion or ejection of the chip-in card can control the input of the input device. Thus, the present invention contemplates on the insertion of a chip-in card as a mechanism to allow or prevent input of the keyboard or mouse in order to control access to the computer. The structure as contemplated by the present invention is simple and very economical. Moreover, the interrupt method can be performed while other application programs are being concomitantly performed in order to enhance the operational efficiency of the computer system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:

a card read and write unit having a card reception slot and a detection switch, for detecting whether a chip-in card is inserted into said card reception slot and for determining whether the inserted card is authorized for enabling an operator to access to the computer system in dependence upon the insertion or ejection of said chip-in card;

a card read and write controller electrically connected to said card read and write unit, for generating an interrupt signal in dependence upon only the insertion or ejection of said chip-in card, and for supplying an initial clock signal to said chip-in card;

input means for allowing the operator to input data to the computer system; and a host controller electrically connected to said card read and write controller, for locking said input means from inputting data to the computer system to prevent unauthorized use of the computer system, and for alternatively unlocking said input means to allow the input of data from said input means to gain access to the computer system in dependence upon only the reception of said interrupt signal.

2. The computer system of claim 1, further comprised of said card read and write unit comprising a light-emitting-diode for alerting the operator of the insertion or ejection of said chip-in card.

3. The computer system of claim 2, wherein said card read and write controller comprises:

a voltage generator for supplying the voltage to be used for said chip-in card;

a clock generator for supplying the initial clock signal to said chip-in card;

a bus interface for bus interface with said host controller;

a serial port for serial data communication with said host controller;

a boot read-only-memory having a booting control program;

a common random-access-memory for storing data; and a central processor for controlling operation of the light-emitting-diode of said card read and write unit to inform the operator whether the chip-in card is inserted or ejected from the card insertion slot in response to said detection signal generated from said detection switch, for generating said interrupt signal, and checking whether data transmitted to the chip-in card and data received from the chip-in card are identical to determine whether the inserted chip-in card is an authorized card for said personal computer system.

4. The computer system of claim 3, wherein said clock signal is supplied to said chip-in card through a damping resistor installed in said card read and write controller.

5. The computer system of claim 4, further comprised of said interrupt signal representing a card insertion interrupt when the inserted card is maintained in place in the reception slot of said card read and write unit.

6. The computer system of claim 4, further comprised of said interrupt signal representing a card ejection interrupt when the inserted card is ejected from the reception slot of said card read and write unit.

7. The computer system of claim 5, further comprised of said host controller locking the keyboard when said interrupt signal represents a card ejection interrupt, and alternatively unlocking the keyboard when said interrupt signal represents a card insertion interrupt.

8. The computer system of claim 7, further comprised of said card read and write unit comprising a light-emitting-diode for alerting the operator of the insertion or ejection of said chip-in card.

9. A computer system, comprising:

an operator input device;

a chip-in card;

a card reader having a reception slot and an indicator for indicating whether the chip-in card is inserted into the reception slot;

a controller for controlling the locking and unlocking of said operator input device to prevent unauthorized use of the computer system in dependence upon only whether the chip-in card is inserted or ejected from the reception slot, said controller comprising:

a voltage generator for supplying a power voltage to be used for said chip-in card;

a clock generator for supplying an initial clock signal to said chip-in card;

a boot read-only-memory containing a booting control program for booting the computer system;

a common random-access-memory for storing data received from the chip-in card and data to be transmitted to the chip-in card; and a central processing unit for controlling operation of the light-emitting-diode of said card read and write unit to inform the operator whether the chip-in card is inserted or ejected from the card insertion slot, and for checking whether data transmitted to the chip-in card and data received from the chip-in card are identical to each other for determining whether the inserted chip-in card is an authorized card for said computer system.

10. The computer system of claim 9, wherein said controller prevents unauthorized use of the computer system by:

controlling said card reader to determine whether the chip-in card is inserted into said reception slot;

when the chip-in card is inserted into said reception slot, determining whether the inserted card is the authorized card for enabling an operator to access to the computer system in dependence upon only the insertion or ejection of said chip-in card;

generating an interrupt signal in dependence only upon the insertion or ejection of said chip-in card;

allowing the operator to input commands and information through said operator input device to gain access to the computer system when said interrupt signal represents the insertion of said chip-in card; and locking said operator input device from inputting commands and information to the computer system thereby preventing unauthorized access to the computer system when said interrupt signal represents the ejection of said chip-in card.

11. The computer system of claim 10, further comprised of said interrupt signal representing a card insertion interrupt when the inserted card is maintained in place in the reception slot of said card reader.

12. The computer system of claim 11, further comprised of said interrupt signal representing a card ejection interrupt when the inserted card is ejected from the reception slot of said card reader.

13. The computer system of claim 12, further comprised of said controller preventing unauthorized access to one type of programs stored in the computer system when said chip-in card is ejected from the receiving slot of said card read and write unit while concomitantly permitting execution of another type of programs stored in the computer system.

14. A method for preventing unauthorized use of a personal computer system having an operator input device, a card reader having a reception slot for receiving a data card, and a host processor for storing a main program and an unauthorized use interrupt routine, said method comprising the steps of:

executing said main program after the computer system is booted;

controlling said card reader to determine whether the data card is inserted into the reception slot of said card reader;

when said data card is inserted into or ejected from said reception slot, executing said unauthorized use interrupt routine to determine whether the inserted data card is an authorized card for enabling an operator to access to the computer system;

generating an interrupt signal in dependence only upon whether the inserted data card is maintained in position of the reception slot or ejected from the reception slot of said card reader;

temporarily disabling operation of said main program;

allowing the operator to input commands and data through said operator input device to access to the computer system in response to said interrupt signal when said interrupt signal indicates that the inserted data card is maintained in position of the reception slot of said card reader;

alternatively, locking said operator input device to prevent the operator from accessing the computer system in response to said interrupt signal when said interrupt signal indicates that the inserted data card is ejected from the reception slot of said card reader; and resuming to execute operation of said main program.

15. The method of claim 14, further comprised of said card reader comprising a light-emitting-diode for alerting the operator of the insertion or ejection of said IC card.

* * * * *

UNITED STATES PATENT AND TRADEMARK OFFICE
CERTIFICATE OF CORRECTION

PATENT NO. : 5,812,762
DATED : Sept. 22, 1998
INVENTOR(S) : Young-Min KIM

It is certified that error appears in the above-indentified patent and that said Letters Patent is hereby corrected as shown below:

On THE COVER page, item

[30], Foreign Priority Application Data, change "7855/1995" to --7585/1995--.

Signed and Sealed this

Twenty-ninth Day of December, 1998

Attest:

BRUCE LEHMAN

Attesting Officer

Commissioner of Patents and Trademarks